(12) United States Patent
Korwan et al.

(10) Patent No.: US 9,310,668 B2
(45) Date of Patent: Apr. 12, 2016

(54) REPLACEABLE DOME ASSEMBLY

(75) Inventors: David J. Korwan, Westford, MA (US);
Bruce W. Baran, Lexington, MA (US);
Glenn Sindledecker, Dracut, MA (US);
Gerard M. Perron, Acton, MA (US);
Edward M. Kolvek, Merrimac, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 365 days.

(21) Appl. No.: 13/809,425

(22) PCT Filed: Apr. 17, 2012

(86) PCT No.: PCT/US2012/033884
§ 371 (c)(1),
(2), (4) Date: Jan. 10, 2013

(87) PCT Pub. No.: WO2012/148730
PCT Pub. Date: Nov. 1, 2012

(65) Prior Publication Data
US 2013/0114993 A1 May 9, 2013

Related U.S. Application Data

(60) Provisional application No. 61/480,926, filed on Apr. 29, 2011.

(51) Int. Cl.
*G03B 17/02* (2006.01)
*G02B 27/20* (2006.01)
*F41G 11/00* (2006.01)

(52) U.S. Cl.
CPC ............. *G03B 17/02* (2013.01); *G02B 27/20* (2013.01); *F41G 11/00* (2013.01); *Y10T 29/49* (2015.01); *Y10T 403/20* (2015.01)

(58) Field of Classification Search
None
See application file for complete search history.

(56) References Cited

U.S. PATENT DOCUMENTS

| | | | | |
|---|---|---|---|---|
| 2,571,187 | A | * 10/1951 | Baxter, Jr. | ..................... 359/822 |
| 2,659,462 | A | 11/1953 | Schwartz et al. | |
| 3,175,037 | A | * 3/1965 | Padgitt | ........................... 348/335 |
| 3,382,630 | A | 5/1968 | Chivers et al. | |
| 4,024,392 | A | 5/1977 | Teppo et al. | |
| 4,050,200 | A | 9/1977 | Beck, Jr. | |
| 4,496,416 | A | 1/1985 | Machler et al. | |

(Continued)

FOREIGN PATENT DOCUMENTS

WO 2009089302 7/2009

*Primary Examiner* — Daniel P Stodola
*Assistant Examiner* — Matthieu Setliff
(74) *Attorney, Agent, or Firm* — Finch & Maloney PLLC; Neil F. Maloney; Jonathan R. Raymond (57) ABSTRACT

Techniques and structures to facilitate efficient replacement of windows/domes of optical systems, such as turreted pointer/tracker systems and seekers and other such gimbal-based or fixed targeting systems. The techniques can be implemented, for example, in a mounting ring or bezel, wherein the dome/window center of curvature is actively aligned during assembly to a reference feature on a mounting bezel during the dome-to-bezel alignment. This reference feature then mechanically registers the dome-bezel assembly to a given chassis. In some embodiments, the techniques allow for positioning of a replacement window/dome on an optical lens system, such that co-boresight of multiple beam paths is automatically maintained.

19 Claims, 7 Drawing Sheets

(56) References Cited

U.S. PATENT DOCUMENTS

| | | | |
|---|---|---|---|
| 4,699,335 A | 10/1987 | DeOms et al. | |
| 5,646,714 A * | 7/1997 | Morimoto et al. | 355/55 |
| 5,822,133 A * | 10/1998 | Mizuno et al. | 359/696 |
| 6,097,553 A * | 8/2000 | Griffin | 359/820 |
| 6,678,001 B1 * | 1/2004 | Elberbaum | 348/373 |
| 6,867,848 B2 * | 3/2005 | Ebinuma et al. | 355/75 |
| 6,896,423 B2 | 5/2005 | Arbuckle et al. | |
| 7,001,930 B2 | 2/2006 | Arnold et al. | |
| 7,002,139 B2 | 2/2006 | Stallard et al. | |
| 7,499,230 B2 * | 3/2009 | Morita | 359/811 |
| 7,909,521 B2 | 3/2011 | Son | |
| 7,963,707 B2 * | 6/2011 | Jung et al. | 396/427 |
| 2007/0002468 A1 * | 1/2007 | Iikawa et al. | 359/811 |
| 2008/0273255 A1 * | 11/2008 | Yang et al. | 359/819 |
| 2013/0114141 A1 * | 5/2013 | Sindledecker et al. | 359/513 |

\* cited by examiner

REPLACEABLE DOME ASSEMBLY

RELATED APPLICATIONS

This application claims the benefit of and priority to U.S. Application No. 61/480,926, filed Apr. 29, 2011, which is herein incorporated by reference in its entirety.

FIELD OF THE DISCLOSURE

The invention relates to optical systems, and more particularly, to techniques and structures for interfacing a window or dome through which an optical system takes in information.

BACKGROUND

An optical lens system can be used in numerous scenarios, including commercial, scientific, and military applications. In some such applications, the optical system is included within a fuselage or other protective housing or structure that is configured with a window or dome that effectively allows the optical system to take in information from a scene within the system's field of view (FOV).

SUMMARY

One embodiment of the present invention provides an optical dome mounting system. The system includes a plurality of alignment bushings, each having a head portion and a chassis engagement portion. The system further includes a dome mount having a first side for engaging with an optical dome and an opposing side for engaging with a chassis and having a plurality of recesses therein, each recess for floatingly receiving the head portion of a corresponding one of the alignment bushings. The system may further include, for example, the optical dome and/or the chassis. In some cases, each of the alignment bushings has a pin portion that is configured to fit snuggly into a corresponding mounting guide hole of the chassis. In some cases, each of the alignment bushings has a hole portion that is configured to fit snuggly over a corresponding mounting guide pin of the chassis. In some cases, the dome mount further comprises a plurality of contact pads for interfacing with a corresponding contact of the chassis. In some such cases, at least some of the contact pads are raised. In other such cases, at least some of the contact pads are recessed. In some cases, the dome mount is saddle-shaped. In other cases, the dome mount is ring-shaped. In some cases, the dome mount can be bonded to, for instance, an optical dome and/or a chassis with a low outgassing adhesive. In some cases, the system allows for positioning a replacement dome on an optical system such that co-boresight of multiple beam paths is maintained.

Another embodiment of the present invention provides an optical dome mounting system. In this case, the system includes a chassis, an optical dome, and a plurality of alignment bushings, each having a head portion and a chassis engagement portion. The system further includes a dome mount having a first side for engaging with the optical dome and an opposing side for engaging with the chassis and having a plurality of recesses therein, each recess for floatingly receiving the head portion of a corresponding one of the alignment bushings. The dome mount is bonded to at least one of the chassis and/or the optical dome with a low outgassing adhesive. In some cases, each of the alignment bushings has a pin portion that is configured to fit snuggly into a corresponding mounting guide hole of the chassis. In other cases, each of the alignment bushings has a hole portion that is configured to fit snuggly over a corresponding mounting guide pin of the chassis. In some cases, the dome mount further comprises a plurality of contact pads for interfacing with a corresponding contact of the chassis. In some such cases, each of the contact pads is raised. In some cases, the system allows for positioning a replacement dome on an optical system such that co-boresight of multiple beam paths is maintained.

Numerous variations will be apparent in light of this disclosure. For instance, another embodiment of the present invention provides a method for making an optical dome mounting system. The method includes providing a plurality of alignment bushings, each having a head portion and a chassis engagement portion. The method further includes providing a dome mount having a first side for engaging with an optical dome and an opposing side for engaging with a chassis and having a plurality of recesses therein, each recess for floatingly receiving the head portion of a corresponding one of the alignment bushings.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 4c' illustrates a cross-section side view, taken across section line c-c, showing details of the contact pads shown in FIG. 4a, in accordance with another embodiment of the present invention.

DETAILED DESCRIPTION

Techniques and structures are disclosed to facilitate efficient replacement of windows/domes of optical systems, such as turreted pointer/tracker systems and seekers and other such gimbal-based or fixed targeting systems. The techniques can be implemented, for example, in a mounting ring or bezel, wherein the dome/window center of curvature is actively aligned during assembly to a reference feature on a mounting bezel during the dome-to-bezel alignment. This reference feature then mechanically registers the dome-bezel assembly to a given chassis. In some embodiments, the techniques allow for positioning of a replacement window/dome on an optical lens system, such that co-boresight of multiple beam paths is automatically maintained. Conventionally, replacement of a dome assembly requires manual realignment of the replacement dome. Such conventional alignment techniques tend to be tedious, labor intensive in a field setting, and may further require fixturing and alignment equipment in the field.

General Overview

As previously explained, an optical lens system is oftentimes included within a fuselage or other protective housing or structure that is configured with a window or dome that effectively allows the optical lens system to take in information from a scene within the system's field of view (FOV). In such applications, the window or dome may have direct exposure to the adverse conditions (e.g., temperature extremes, driven sand, dust, rain, hail, vibration, and/or foreign object debris). Over time, the window or dome may degrade in performance from exposure to such adverse conditions. As a result, it may become desirable to replace the window/dome.

In an effort to reduce down time for a tedious and lengthy custom dome alignment, and in accordance with an embodiment of the present invention, an interchangeable dome assembly is provided by using a common reference feature on all dome assemblies for a given application. As a result, spare domes can be in stock, for instance, at a maintenance facility and replacement entails using a mechanical registration of the dome reference surface to the turret (or other chassis) upon which the dome is installed.

In one such embodiment, the mechanical registration enables positioning of the replacement dome on a turreted system such that co-boresight of multiple beam paths is maintained. For instance, in one such specific case, the multiple beam paths may include an incoming infrared tracker beam and an outgoing laser beam. Other multiple beam path schemes will be apparent in light of this disclosure, and the claimed invention is not intended to be limited to any particular one. For instance, the outgoing beam may include both laser and infrared beams. The beam path scheme will depend on the given application.

In one specific example embodiment employing an optical dome and pointer/tracker gimbal-based turret system for countermeasures (e.g., jamming, etc.) against surface-to-air threats, the dome center of curvature is actively aligned during assembly to a reference feature on a dome bezel during the dome-to-bezel alignment. This reference feature then mechanically registers the dome-bezel assembly to the system housing (e.g., jamhead housing or other chassis associated with the optical system) with sufficient accuracy to provide the precise alignment required to meet the co-boresight to the turret optics.

The techniques effectively allow for alignment capture in the factory rather than necessitating a field adjustment, and therefore save labor and eliminate the need for field fixturing and alignment equipment. Any number of applications employing an optical system that requires periodic window/dome replacement can benefit from the techniques provided herein.

Interchangeable Dome Assembly

Figure 1A:
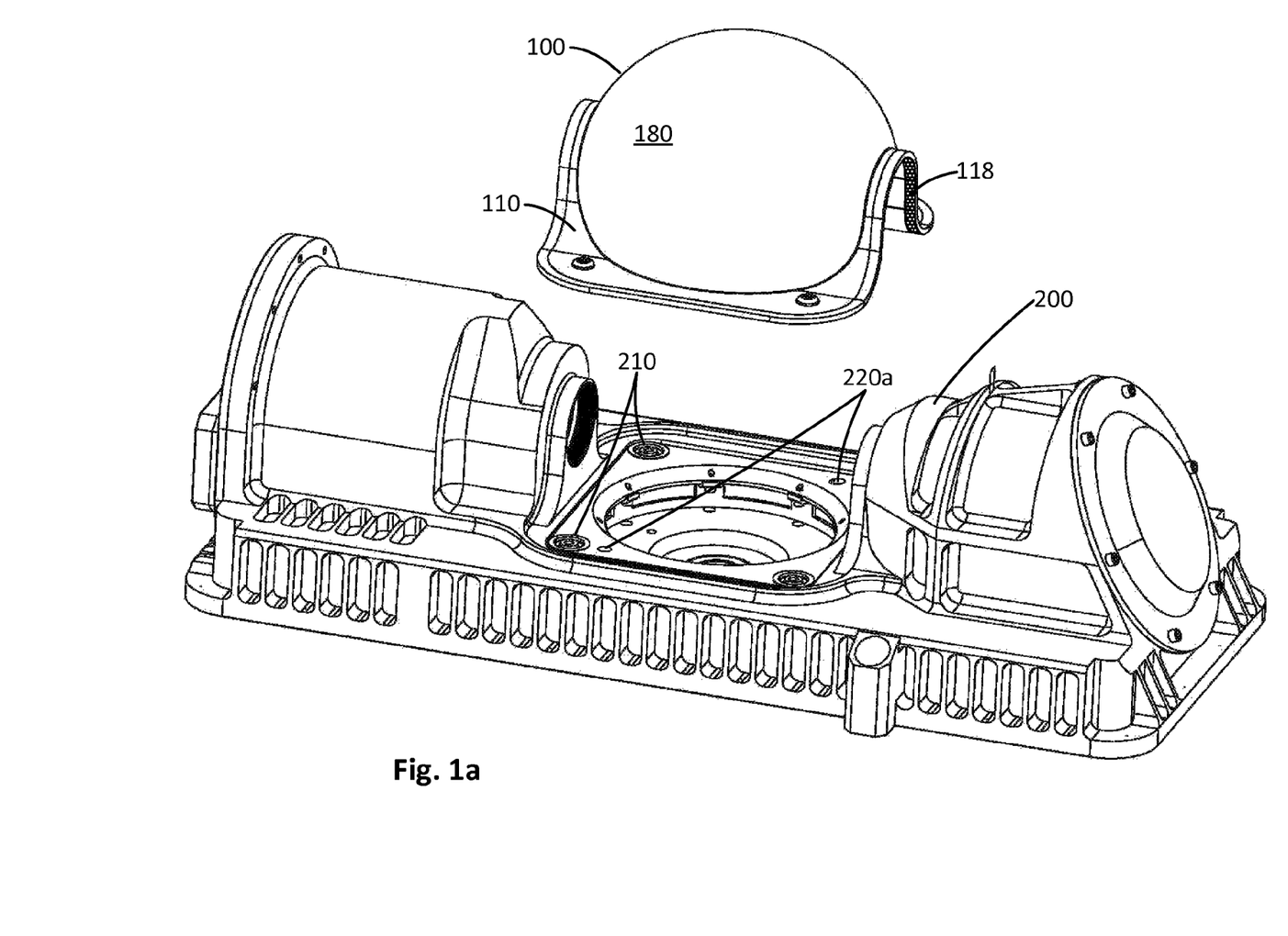
FIG. 1a illustrates a perspective view of an interchangeable dome assembly and a chassis on which it is to be installed, in accordance with an embodiment of the present invention.
Figure 1B:
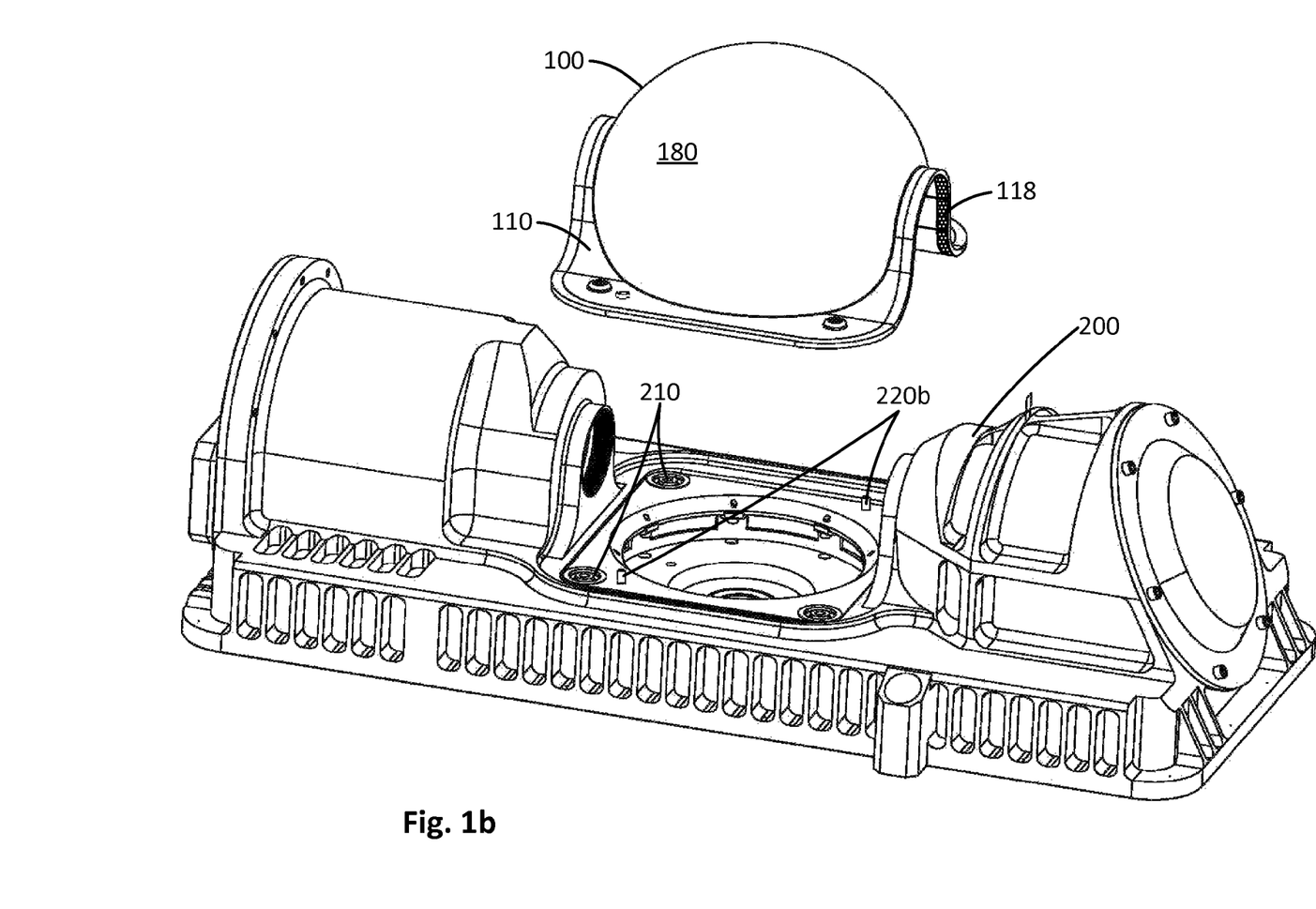
FIG. 1b illustrates a perspective view of an interchangeable dome assembly and a chassis on which it is to be installed, in accordance with another embodiment of the present invention.

FIG. 1a illustrates a perspective view of an interchangeable dome assembly 100 and a chassis 200 on which the dome assembly 100 is to be installed, in accordance with an embodiment of the present invention. FIG. 1b illustrates a perspective view of an interchangeable dome assembly 100 and a chassis 200 on which it is to be installed, in accordance with another embodiment of the present invention.

The chassis 200 can be any type of chassis, and the various extraneous implementation details associated therewith are not particularly material to embodiments of the claimed invention, other than the specific features that engage or are otherwise configured specifically to interface with the interchangeable dome assembly 100, as will be apparent in light of this disclosure, such as the mounting guides 220a, 220b and contacts 210. In addition, the location on the chassis 200 that mates with the interchangeable dome assembly 100 may be dimensioned and shaped or otherwise machined to accommodate corresponding dimensions and shapes of the interchangeable dome assembly 100.

As can be seen, the interface between the interchangeable dome assembly 100 and the chassis 200 includes two dome mounting guides 220a (in FIG 1a) or 220b (in FIG. 1b) and four dome contact pads 210. The dome mounting guides are shown as holes in the example embodiment of FIG. 1a, but in other embodiments may be pins (e.g., as in the example embodiment of FIG. 1b). Likewise, the dome contacts 210 are shown as recesses in the example embodiments of FIGS. 1a-1b, but in other embodiments may be raised pads. As will be further appreciated in light of this disclosure, the corresponding interface features of the dome assembly 100 can be configured to complement or otherwise operatively couple with the features of the chassis-side interface. Further variations and details with respect to the dome/window mounting guides 220a, 220b and contacts 210 will be discussed with reference to FIGS. 2a through 4c'.

Figure 2A:
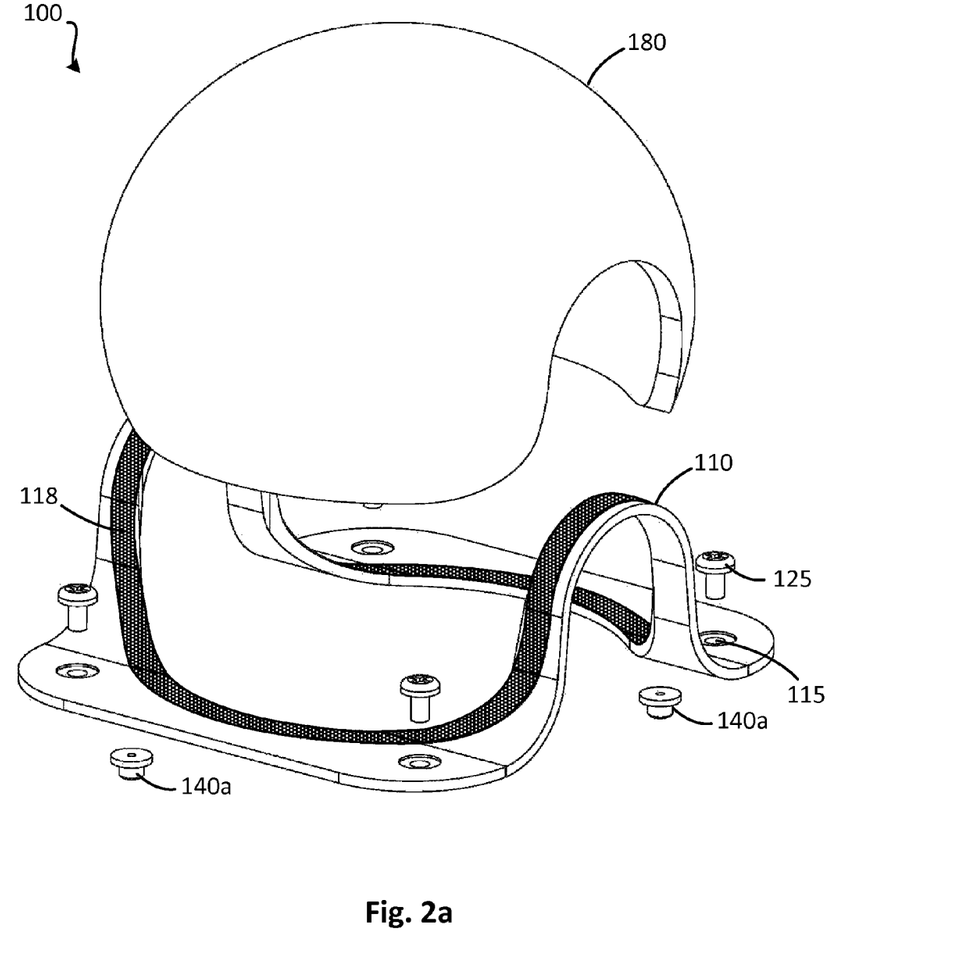
FIG. 2a illustrates an exploded view of an interchangeable dome assembly configured in accordance with an embodiment of the present invention.
Figure 2B:
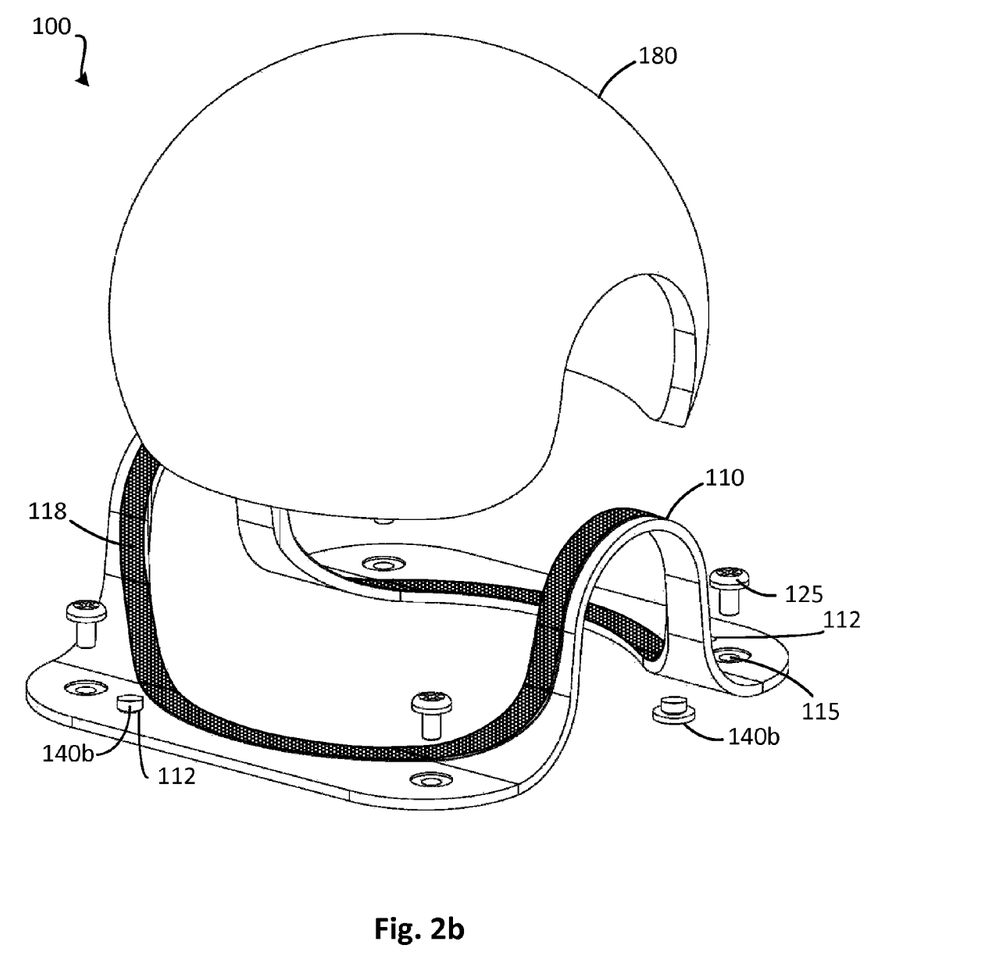
FIG. 2b illustrates an exploded view of an interchangeable dome assembly configured in accordance with another embodiment of the present invention.

FIG. 2a illustrates an exploded view of an interchangeable dome assembly 100 configured in accordance with an embodiment of the present invention. FIG. 2b illustrates an exploded view of an interchangeable dome assembly 100 configured in accordance with another embodiment of the present invention. As can be seen, the assembly 100 includes a saddle-shaped mount 110 (referred to herein-after as a saddle mount 110) and a dome 180 having a corresponding shape. In this example case, an adhesive bond 118 can be used to secure the dome 180 to the saddle mount 110 as shown. Four fasteners 125 are used, in this example configuration, to secure the assembly 100 to the chassis 200, and two alignment bushings 140a are provided, as will be further described with reference to FIGS. 3a through 4c'.

A bonding adhesive 118 may also be used between the chassis 200 and the saddle 110, in some embodiments (e.g., as generally can be seen in FIGS. 1a-1b). Any number of structural adhesives can be used, depending on the particulars of the application. In one specific example, the structural adhesive may be RTV566 silicone. In a more general sense, any low-outgassing and flexible adhesive sealant may be used to bond the dome 180 to the saddle 110, as well as to bond the dome assembly 100 to the chassis 200 over, for example, a gimbal assembly.

The shape of the dome mount 110 can be particular to a given application, which in this example case calls for the saddle shape. Other shapes can be used as well, depending on factors such as the shape of the interface between the dome 180 and chassis 200 and the size of the dome 180. Other embodiments may have, for example, a flat interface between the dome 180 and chassis 200, where the mount could be ring-shaped. The saddle mount 110 can be made of any suitable material. Example factors to consider include the coefficient of thermal expansion (CTE) of the dome 180 and chassis 200 materials. In one specific example case, for instance, the saddle mount 110 is implemented with Alloy 39 and the chassis 200 with aluminum 6061. Depending on the design and/or geometry, other suitable saddle mount material options include Invar 36®, Alloy 42, and Kovar®, just to name a few. This particular group of materials (including Alloy 39), all of which are produced by Carpenter Technology Corporation, are all low expansion iron nickel alloys that are engineered specifically to provide CTE variability to a designer. As will be appreciated, the claimed invention is not intended to be limited to any particular one or type of mount materials. Other mount materials include, for instance, aluminum, titanium, steel, and alloys thereof.

The dome 180 can be, for example, a hemispherical shape, a volumetric ellipsoidal shape, or volumetric polygonal shape. In some embodiments, the dome 180 may be implemented, for instance, with a low-expansion optical material, such as, but not limited to, aluminium oxynitride, silicon, germanium, spinel, or sapphire. Numerous other suitable dome materials can be used as well, depending on application factors such as the wavelength range of interest, harshness of operating environment, and the desired CTE of the dome 180, and the claimed invention is not intended to be limited to any particular dome configuration.

Figure 3A:
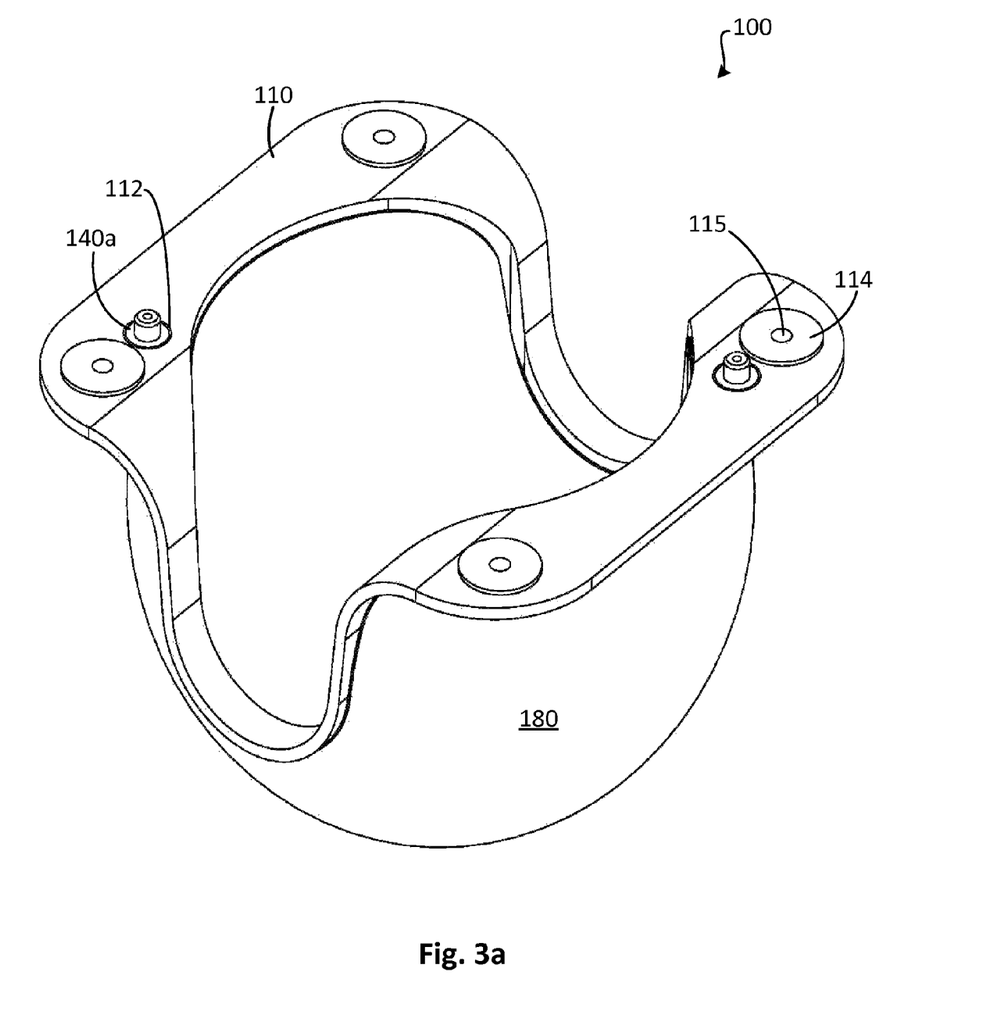
FIG. 3a illustrates a bottom view of an interchangeable dome assembly configured in accordance with an embodiment of the present invention.
Figure 3B:
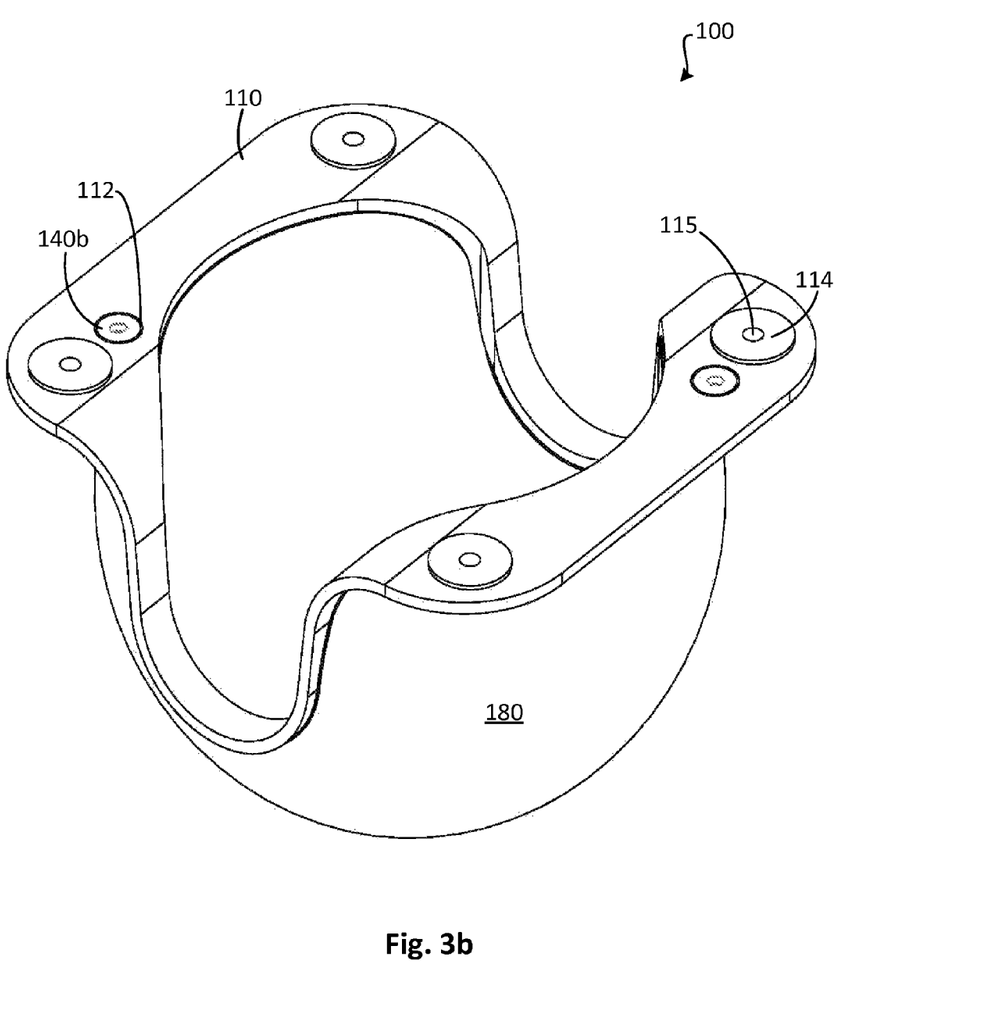
FIG. 3b illustrates a bottom view of an interchangeable dome assembly configured in accordance with another embodiment of the present invention.

FIG. 3a illustrates a bottom view of an interchangeable dome assembly 100 configured in accordance with an embodiment of the present invention. FIG. 3b illustrates a bottom view of an interchangeable dome assembly 100 configured in accordance with another embodiment of the present invention. As can be seen, each of the two alignment bushings 140a and 140b shown in FIGS. 3a-3b, respectively, floats in a recess 112 on the side of the saddle mount 110 that interfaces with the chassis 200. The recess 112 is slightly larger than the bushing 140a,140b, so as to allow for a degree of play (e.g., 0.2 to 2.0 mm of play), while the portion of the bushing 140a, 140b that mates with the chassis 200 fits snugly into the dome mounting guides 220a shown in FIG. 1 a (or snugly onto the dome mounting guides 220b shown in FIG. 1b). In this sense, the bushings 140a, 140b are fixed to the dome mounting guides 220a 220b, but float in the saddle 110, so as to provide for a relatively quick alignment process. In one such embodiment, all domes 180 are aligned to a master fixture, which would be identical to the chassis 200 portion that interfaces with the interchangeable dome assembly 100. The floating bushing 140a, 140b locations are set in the master fixture and bonded in position (XY alignment). The dome mounting guide locations 220a, 220b are transferred from the same master fixture to the chassis 200. In addition, the four raised dome contact pads 210 can be lapped for Z alignment. Other embodiments may be configured with more or fewer such contact pads 210 (or none).

Figure 4A:
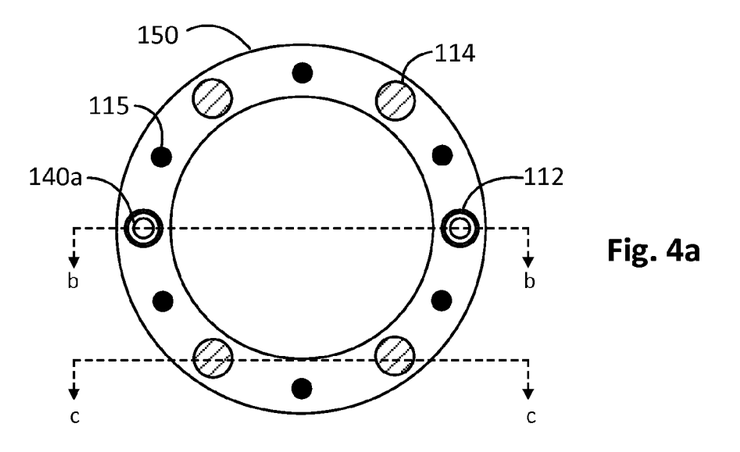
FIG. 4a illustrates a bottom view of a mounting ring configured in accordance with another embodiment of the present invention.

FIG. 4a illustrates a bottom view of a mounting ring 150 configured in accordance with another embodiment of the present invention. As will be appreciated, such a mounting ring 150 can be used in place of a saddle-shaped mount 110 in embodiments having a flat interface between the dome 180 and chassis 200. As can be seen, the mounting ring 150 includes a number of contact pads 114 (four in this example case) and a number of alignment bushings 140a (two in this example case) and a number of fastener holes 115 (six in this example case). The previous discussion with respect to materials and geometries is equally applicable here, and any number of configurations will be apparent in light of this disclosure.

Figure 4B:
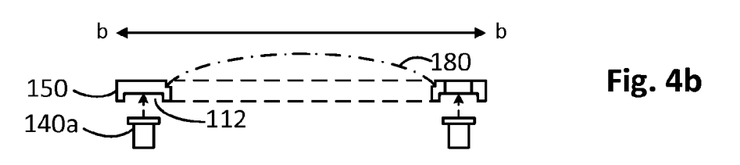
FIGS. 4b through 4b'' each illustrate a cross-section side view, taken across section line b-b, showing details of the mounting ring and alignment bushings shown in FIG. 4a, in accordance with another embodiment of the present invention.

FIGS. 4b through 4b" each illustrate a cross-section side view, taken across section line b-b, showing details of the mounting ring 150 and alignment bushings 140a shown in FIG. 4a, in accordance with another embodiment of the present invention. As can be seen in FIG. 4b, the dome 180 is not included, but its location is shown with a dot-dashed line, and in this example case is a low profile symmetrical dome. Any number of suitable dome or window configurations can be used. As can be further seen, the mounting ring 150 includes a recess 112 for each of the two alignment bushings 140a. FIG. 4b shows the alignment bushings 140aseparate from the mounting ring 150, and FIG. 4b' shows the alignment bushings 140aengaged with the mounting ring. As best shown in FIG. 4b", each of the alignment bushings 140ais allowed to float in its corresponding mounting ring recess 112, as there is a small gap having a width $w_f$ to either side of the bushing 140a head. The depth of the recess 112 can be set as desired and in this example embodiment is sufficient to allow the head of each alignment bushing 140a to be flush with the ring 150. The portion of the alignment bushing 140a that engages the chassis 200 may be, for instance, a pin that snugly engages a corresponding hole 220a in the chassis 200 (e.g., as discussed with reference to FIGS. 1a, 2a, and 3a). Alternatively, the portion of the alignment bushing 140b that engages the chassis 200 may be, for instance, a hole that snugly engages a corresponding pin 220b in the chassis 200 (e.g., as discussed with reference to FIGS. 1b, 2b, and 3b). FIG. 4b" further illustrates a recess 128 on the dome interface side of the ring, for engaging the dome 180.

Figure 4C:
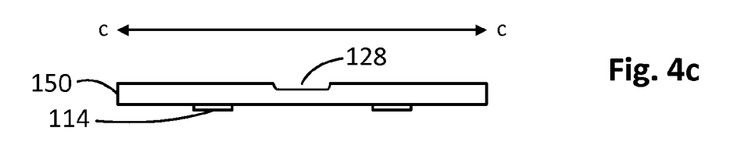
FIG. 4c illustrates a cross-section side view, taken across section line c-c, showing details of the contact pads shown in FIG. 4a, in accordance with one embodiment of the present invention.

FIG. 4c illustrates a cross-section side view, taken across section line c-c, showing details of the contact pads 114 shown in FIG. 4a, in accordance with one embodiment of the present invention. In this example case, the contact pads 114 are essentially posts which may, for example, engage with corresponding pads 210 on the chassis 200. The corresponding pads 210 on the chassis 200 may be flat and flush, recessed, or post-like. Just as with the alignment bushings 140a 140b, a degree of play can be provided in the contact pad interface, so as to allow floating. FIG. 4c' illustrates a cross-section side view, taken across section line c-c, showing details of the contact pads 114 shown in FIG. 4a, in accordance with another embodiment of the present invention. In this example case, the contact pads 114 are recesses. The corresponding pads 210 on the chassis 200 may be post-like, and allow a degree of play, as previously explained. Numerous alignment bushing 140a, 140b and contact pad 114, 210 configurations will be apparent in light of this disclosure. In any such cases, the center of curvature can be actively aligned during assembly to a reference feature on a dome bezel during the dome-to-bezel alignment, and this reference feature can be used to mechanically register the dome-bezel assembly to the system chassis, as explained herein. Once the floating alignment/assembly process is complete, fasteners 125 (e.g., screws or other suitable fastener) can then be used to secure the dome mount assembly 100 to the chassis 200.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An optical dome mounting system, comprising:
    a plurality of alignment bushings, each having a head portion and a chassis engagement portion; and
    a dome mount having a first side for engaging with an optical dome and an opposing side for engaging with a chassis and having a plurality of recesses therein, each recess for floatingly receiving the head portion of a corresponding one of the alignment bushings, wherein the head portion of each alignment bushing has an outer circumference that is less than an inner circumference of its corresponding recess such that the difference in size between the outer circumference of the head portion and the inner circumference of the recess allows for about 0.2-2.0 mm of play therebetween; and
    wherein mechanical registration of the alignment bushings with the recesses of the dome mount allows for positioning of a replacement optical dome of an optical system such that co-boresight of multiple beam paths through the optical dome is automatically maintained, the multiple beam paths associated with one or more devices configured to at least one of transmit and receive an optical signal through the optical dome.

2. The system of claim 1, further comprising the optical dome.

3. The system of claim 2 wherein the dome mount is bonded to the optical dome with a low outgassing adhesive.

4. The system of claim 1, further comprising the chassis.

5. The system of claim 4 wherein the dome mount is bonded to the chassis with a low outgassing adhesive.

6. The system of claim 1 wherein each of the alignment bushings has a pin portion that is configured to fit into a corresponding mounting guide hole of the chassis.

7. The system of claim 1 wherein each of the alignment bushings has a hole portion that is configured to fit over a corresponding mounting guide pin of the chassis.

8. The system of claim 1 wherein the dome mount further comprises a plurality of contact pads for interfacing with a corresponding contact of the chassis.

9. The system of claim 8 wherein at least one of the contact pads is raised.

10. The system of claim 8 wherein at least one of the contact pads is recessed.

11. The system of claim 1 wherein the dome mount is saddle-shaped.

12. The system of claim 1 wherein the dome mount is ring-shaped.

13. An optical dome mounting system, comprising:
    a chassis;
    an optical dome;
    a plurality of alignment bushings, each having a head portion and a chassis engagement portion; and
    a dome mount having a first side for engaging with the optical dome and an opposing side for engaging with the chassis and having a plurality of recesses therein, each recess for floatingly receiving the head portion of a corresponding one of the alignment bushings, wherein the head portion of each alignment bushing has an outer circumference that is less than an inner circumference of its corresponding recess such that the difference in size between the outer circumference of the head portion and the inner circumference of the recess allows for play therebetween;
    wherein the dome mount is bonded to at least one of the chassis and the optical dome with a low outgassing adhesive; and
    wherein mechanical registration of the alignment bushings with the recesses of the dome mount allows for positioning of a replacement optical dome of an optical system such that co-boresight of multiple beam paths through the optical dome is automatically maintained, the multiple beam paths associated with one or more devices configured to at least one of transmit and receive an optical signal through the optical dome.

14. The system of claim 13 wherein each of the alignment bushings has a pin portion that is configured to fit into a corresponding mounting guide hole of the chassis.

15. The system of claim 13 wherein each of the alignment bushings has a hole portion that is configured to fit over a corresponding mounting guide pin of the chassis.

16. The system of claim 13 wherein the dome mount further comprises a plurality of contact pads for interfacing with a corresponding contact of the chassis.

17. The system of claim 16 wherein at least one of the contact pads is raised.

18. The system of claim 13 wherein the difference in size between the outer circumference of the head portion and the inner circumference of the recess allows for about 0.2-2.0 mm of play therebetween.

19. A method for making an optical dome mounting system, the method comprising:
    providing a plurality of alignment bushings, each having a head portion and a chassis engagement portion; and
    providing a dome mount having a first side for engaging with an optical dome and an opposing side for engaging with a chassis and having a plurality of recesses therein, each recess for floatingly receiving the head portion of a corresponding one of the alignment bushings, wherein the head portion of each alignment bushing has an outer circumference that is less than an inner circumference of its corresponding recess such that the difference in size between the outer circumference of the head portion and the inner circumference of the recess allows for about 0.2-2.0 mm play therebetween, and wherein mechanical registration of the alignment bushings with the recesses of the dome mount allows for positioning of a replacement optical dome of an optical system such that co-boresight of multiple beam paths through the optical dome is automatically maintained, the multiple beam paths associated with one or more devices configured to at least one of transmit and receive an optical signal through the optical dome.

* * * * *